United States Patent
Sternowski (10) Patent No.: US 6,998,908 B1
(45) Date of Patent: Feb. 14, 2006

(54) ADAPTIVE INTERFERENCE CANCELLATION RECEIVING SYSTEM USING SYNTHESIZER PHASE ACCUMULATION

(75) Inventor: Robert H. Sternowski, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 189 days.

(21) Appl. No.: 10/457,986

(22) Filed: Jun. 10, 2003

(51) Int. Cl.
*H03D 3/00* (2006.01)

(52) U.S. Cl. .................. 329/320; 327/105; 327/107; 375/376

(58) Field of Classification Search ............... 329/320; 327/105, 107; 375/376
See application file for complete search history.

(56) References Cited

U.S. PATENT DOCUMENTS

| | | | |
|---|---|---|---|
| 3,699,444 A | 10/1972 | Ghose | |
| 3,928,813 A | 12/1975 | Kingsford-Smith | |
| 4,952,193 A | 8/1990 | Talwar | |
| 5,317,322 A | 5/1994 | Grobert | |
| 5,903,194 A | 5/1999 | Opsahl | |
| 6,370,205 B1 * | 4/2002 | Lindoff et al. | 375/319 |

\* cited by examiner

*Primary Examiner*—Michael B. Shingleton
(74) *Attorney, Agent, or Firm*—Nathan O. Jensen; Kyle Eppele (57) ABSTRACT

An adaptive interference cancellation receiving system uses synthesizer phase accumulation. A coupler coupled to a transmitter samples an undesired transmit signal. An adaptive interference canceller (AIC) module varies phase and amplitude of the sampled undesired transmit signal to provide a cancellation output signal. The AIC module has a frequency synthesizer with phase accumulation for varying the phase of the sampled undesired transmit signal. An antenna receives receive signals and the undesired transmit signal. A summing circuit connected to the receive antenna and the adaptive interference module sums the receive signals, the received undesired transmit signal, and the cancellation signal to cancel the received undesired transmit signal. An AIC controller module is coupled to the summing circuit output to detect a null in the undesired transmit signal, to generate a cancellation feedback signal, and to provide the cancellation feedback signal to the AIC module.

17 Claims, 7 Drawing Sheets

ADAPTIVE INTERFERENCE CANCELLATION RECEIVING SYSTEM USING SYNTHESIZER PHASE ACCUMULATION

BACKGROUND OF THE INVENTION

This invention relates to radio communications systems, methods of canceling interference in a radio communications system on a small platform, and specifically to an adaptive interference cancellation receiving system.

Self-generated interference imposes a major limit on radio communications system performance where many transmitters and receivers are crowded onto a relatively small platform such as a ship or aircraft. Traditional solutions have focused on RF bandpass filters, better equipment performance, and antenna isolation. No combination of these techniques today has sufficiently reduced cosite interference to acceptable levels.

Interference cancellation systems, such as that disclosed in U.S. Pat. No. 3,699,444, incorporated herein by reference, have been used, to minimize or eliminate interference in radio receivers. These adaptive interference cancellation (AIC) systems are very simple in theory, but very complex in practice. AIC systems sample the output of each collocated transmitter and shift phase and amplitude of a sampled transmitter signal so that when summed with a transmitter interference impinging signal on a victim receiver antenna, the two signals will exactly cancel, leaving the receiver (ideally) interference-free. While this technique is basic in principle and well-known in the radio art, it has been very difficult to implement in a complex multi-channel system due to the difficulty in achieving stable, fine-resolution variable phase shifting at a reasonable cost.

What is needed is a means and apparatus for implementation of an AIC system using a novel phase shift means.

SUMMARY OF THE INVENTION

An adaptive interference cancellation receiving system using synthesizer phase accumulation is disclosed. The adaptive interference cancellation receiving system comprises a fundamental transmitter frequency canceling layer. The fundamental transmitter frequency canceling layer includes a plurality of couplers coupled to a plurality of transmitters for sampling undesired transmit signals. A plurality of adaptive interference canceller (AIC) modules are connected to the plurality of couplers for varying phase and amplitude of the sampled undesired transmit signals to provide cancellation output signals. The adaptive interference canceller modules further comprise frequency synthesizers with the synthesizer phase accumulation for varying the phase of the sampled undesired transmit signals. A receive antenna receives receive signals and the undesired transmit signals from the transmitters. A receive multicoupler is connected to the receive antenna for splitting the receive and the undesired transmit signals for several receivers. A first summing circuit is connected to the receive antenna and the adaptive interference modules for summing the receive signals, the received undesired transmit signal, and the cancellation signals to cancel the received undesired transmit signals. An AIC controller module coupled to the first summing circuit output detects nulls in the undesired transmit signals, generates cancellation feedback signals and provides the cancellation feedback signals to the AIC modules to vary the phase and amplitude of the cancellation output signal.

An on-channel interference cancellation subsystem layer may be added to the adaptive interference cancellation receiving system for canceling on-channel interference signals. The on-channel interference subsystem further comprises a probe antenna located near a transmit antenna for sampling the on-channel interference signals. An AIC probe multicoupler is connected to the probe antenna. A plurality of second AIC modules are connected to the AIC probe multicoupler and are tuned to a plurality of frequencies of the on-channel interference signals. The second AIC modules vary phase and amplitude of the sampled on-channel interference signals to provide a plurality of on-channel cancellation output signals. The plurality of second AIC modules further comprise frequency synthesizers with synthesizer phase accumulation for varying the phase of the sampled on-channel interference signals. A plurality of second summing circuits are connected to the receive multicoupler and the plurality of second AIC modules for summing the receive signals, the receive on-channel interference signals, and the on-channel cancellation output signals to cancel the received on-channel interference signals. A plurality of AIC controller/receiver modules are coupled to the plurality of summing circuit outputs to receive the receive signals, to detect nulls in the on-channel interference signals, to generate on-channel cancellation feedback signals, and to provide the on-channel cancellation feedback signals to the plurality of second AIC modules to vary the phase and amplitude of the on-channel cancellation output signals.

It is an object of the present invention to provide a means and apparatus for implementation of an AIC system using a novel phase shift means.

It is a object of the present invention to provide a fine resolution wide range phase control to provide precise phase cancellation in an AIC system.

It is an object of the present invention to provide a two-layer architecture for fundamental transmitter frequency canceling and on-channel interference canceling.

It is an advantage of the present invention to provide AIC modules that are modified standard receiver modules.

It is an advantage of the present invention to provide an AIC controller module that is a standard receiver module.

It is a feature of the present invention to provide a simple and inexpensive means for varying phase in an AIC system.

BRIEF DESCRIPTION OF THE DRAWINGS

The invention may be more fully understood by reading the following description of the preferred embodiments of the invention in conjunction with the appended drawings wherein.

DETAILED DESCRIPTION

An adaptive interference cancellation receiving system is disclosed that overcomes most of the limitations of the conventional systems. The present invention is for alternative approach to implementing adaptive interference cancellation at receivers of a cosite system, and in particular utilizes a modulated fractional divider (MFD) synthesizer in a novel way to implement the cancellation function.

Figure 1:
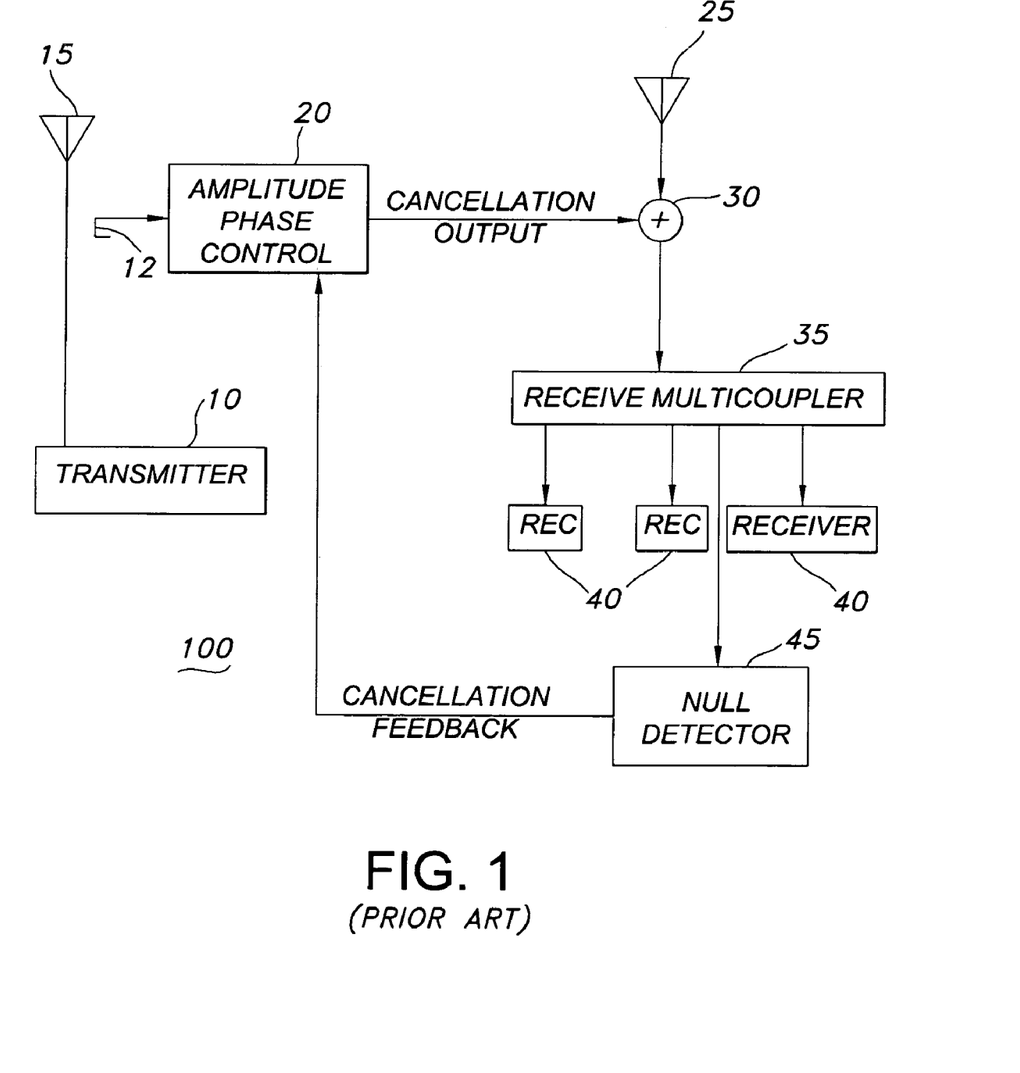
FIG. 1 is a block diagram of an adaptive interference canceller system known in the art.

An adaptive interference canceller (AIC) 100 known in the art is shown in a simplified block diagram in FIG. 1. In FIG. 1 transmitter 10 is transmitting with transmit antenna 15 at some frequency different than that of receivers 40 that are collocated with the transmitter and are trying to receive simultaneously with the transmissions. Some of the transmit signal from transmitter 10 is sampled with coupler 12. Coupler 12 may be a directional coupler or some other means of coupling a radio signal. The signal from the coupler 12 is passed to amplitude and phase control 20 where the amplitude and phase of the sampled transmit signal are adjusted giving a cancellation output signal. A receive antenna 25 receives desired signals and the transmit signal from transmit antenna 15. The received desired signals and the undesired transmit signal are summed with the cancellation output signal from amplitude and phase control 20 in summing circuit 30. The summing circuit 30 may be a hybrid, directional coupler, or some other means of summing radio signals. When the cancellation output signal has the correct phase and amplitude, the undesired transmit signal received by antenna 25 is cancelled in the summing circuit 30. The received signals are passed to a receive multicoupler 35, known in the art, where they are split and passed to receivers 40. A received signal may be passed from multicoupler 35 or coupler (not shown) to a null detector 45 that generates an error or cancellation feedback signal for the amplitude and phase control 20 if the undesired transmit signal is not totally cancelled in summing circuit 30.

An important requirement of an interference canceling system 100 is the ability to shift the phase and amplitude in the phase and amplitude control 20 of the sample of the interfering transmit signal such that, when the cancellation output signal is summed at the input to a victim receiver 40, it exactly cancels out the interference. This requires an amplitude and phase control 20 of some type that can shift the phase and amplitude in very small increments, preferably over a wide range. While a variable attenuator with fine increments is easily obtained, fine increment phase shifters are complex, large and expensive, if indeed they can be had with the necessary small phase increments and wide phase range.

Figure 2A:
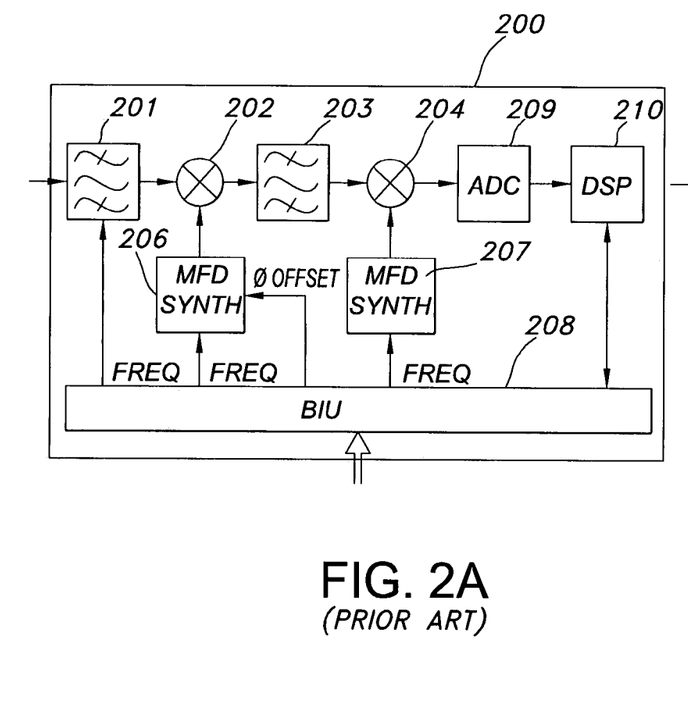
FIG. 2a is a block diagram of a receiver module employing a modulated fractional divider synthesizer that may be used in an adaptive interference canceller system.

A novel approach to implementing an adaptive interference cancellation receiving system of the present invention is to modify a standard receiver module 200 in FIG. 2a containing a MFD (modulated fractional divider) synthesizer 206 for use as the amplitude and phase control block 20 of FIG. 1. In the receiver module 200 a received signal is input to a preselector 201 where the received signal is filtered in a variable bandpass. The output of the preselector 201 is applied to an mixer 202 where an injection signal from the MFD synthesizer 206 is mixed with the received signal and down converted to some intermediate frequency (IF). The IF signal may be bandpass filtered in filter 203 and then passed to another mixer 204 to again be down converted with an injection from another MFD synthesizer 207. The output from mixer 204 is digitized in ADC (analog-to-digital converter) 209 for processing in DSP (digital signal processor) 210. Processing in the DSP 210 may include decimation, demodulation, and other functions necessary for the received signals. The DSP 210 output is applied to BIU (bus interface unit) 208 that passes the processed and received signals to other functions (not shown) as required by the system. In addition, the BIU 208 provides frequency control signals to tune the preselector 210, synthesizers 206 and 207, and a phase control signal to variable MFD phase synthesizer 206.

Figure 2B:
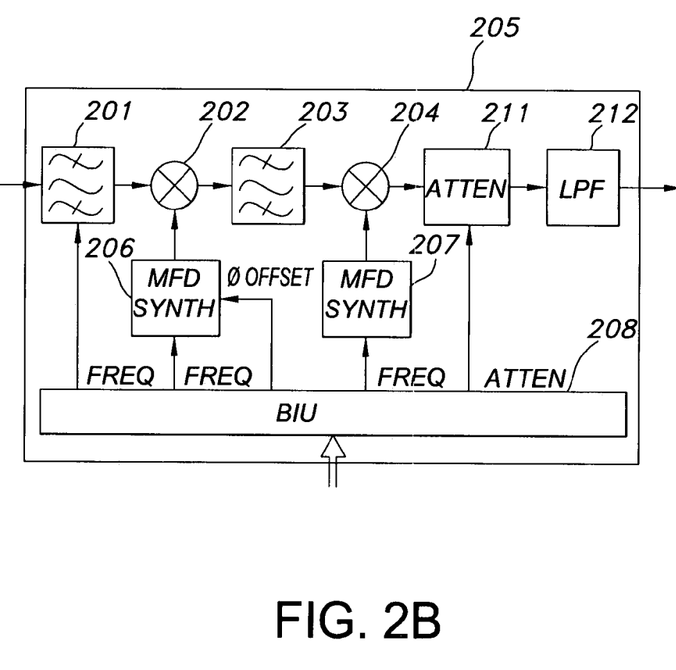
FIG. 2b is a block diagram of a modified receiver module of FIG. 2a that may be used as an adaptive interference cancellation module in the present invention.

The receiver module 200 of FIG. 2a is modified as shown in FIG. 2b to realize an adaptive interference cancellation (AIC) module 205 for use in the present invention. Circuit functions from the receiver module 200 including preselector 201, mixer 202, bandpass filter 203, mixer 204, MFD synthesizers 206 and 207, and BIU 208 are used in the AIC module 205. MFD synthesizer 206 provides the variable phase offset under control from the BIU 208. The ADC 209 and DSP 210 of the receiver module 200 are replaced with a variable attenuator 211 under control from the BIU 208 to provide an amplitude control function and low pass filter 212 to filter the cancellation output signal from the AIC module 205.

A MFD synthesizer that may be used to provide a precision variable phase shift in the present invention is disclosed in U.S. Pat. No. 5,903,194, Digital Phase Modulation of Frequency Synthesizer Using Modulated Fractional Division, incorporated herein by reference, and shown in FIG. 3a. The MFD synthesizer disclosed in the reference patent is a phase-locked loop frequency synthesizer system that uses fractional frequency division and a fractional control number for phase modulating an output of the frequency synthesizer using an incoming information signal. Other similar MFD synthesizers may be used in the present invention.

Figure 3A:
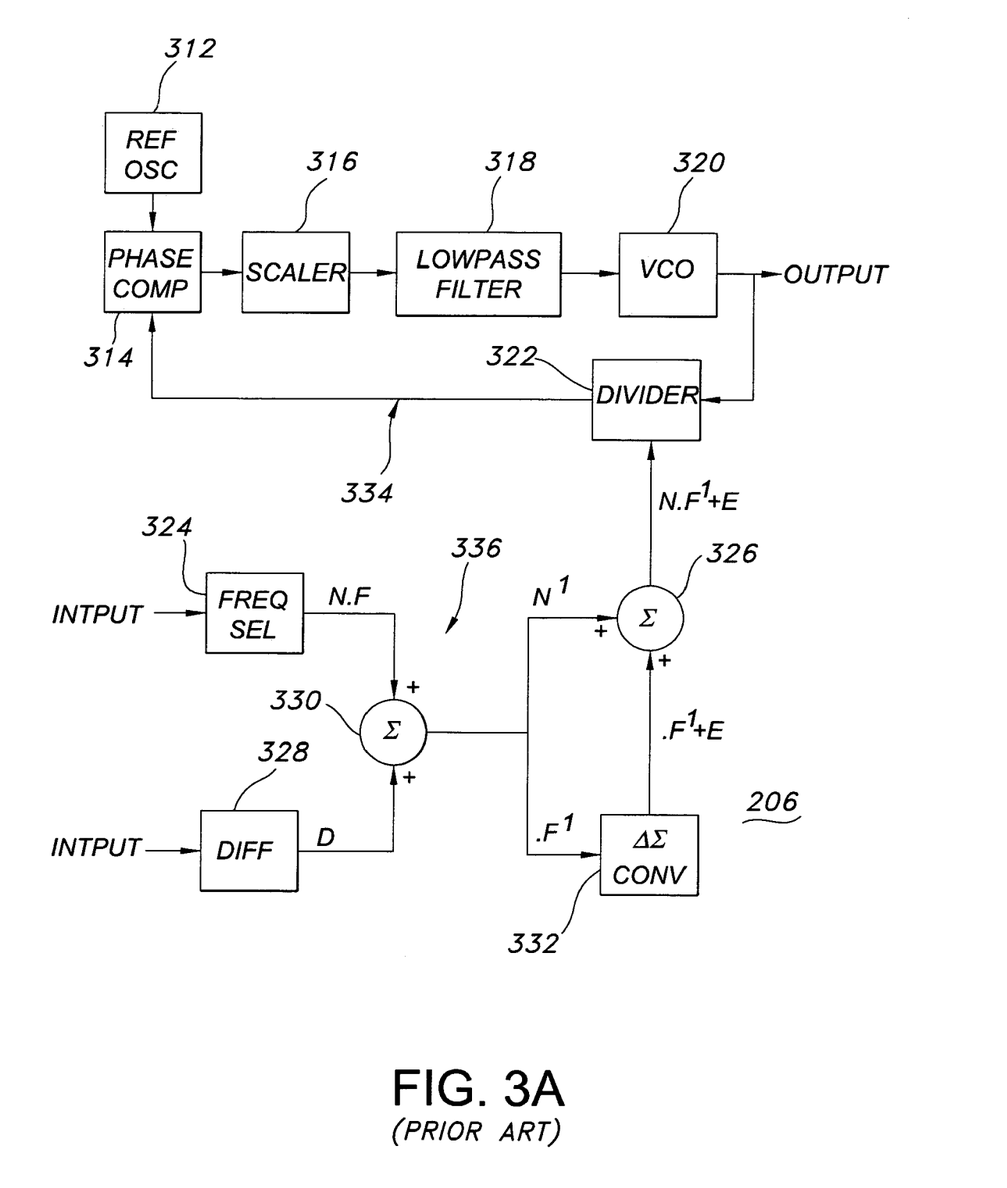
FIG. 3a is a block diagram of a modulated fractional divider synthesizer that provides a variable phase shift for use in the present invention.

In FIG. 3a, the MFD synthesizer 206 includes a phase locked loop (PLL) frequency synthesizer section 334 and a modulation control section 336. The PLL synthesizer 334 includes a VCO 320 operating under the control of a reference oscillator 312 and feedback signal through a divider 322 from the VCO 320. Frequency control of the PLL synthesizer 334 is accomplished by dividing an output frequency of the PLL synthesizer 334 by a divisor within the divider 322. A phase difference between an output of the divider 322 and reference oscillator 312 is detected within a phase comparator 314, scaled within a scaler 316, low-pass filtered in a filter 318 and applied as a frequency control signal to the VCO 320.

Phase modulation or phase control of the MFD synthesizer 206 is accomplished by applying a phase offset signal from the BIU 208 as an input signal to differentiator 328 to detect variations from one phase control data word to the next. Variations may be any level change in a multi-bit (e.g., 16 bit) word of a digitized information stream. The differentiator 328 output D is scaled and added to a fractional frequency control number N.F from frequency select 324 to produce a phase modulated fractional control number $N^1.F^1$. Frequency select data is also received from BIU 208. Scaling in this context means lateral shifting of the differentiated value within a register such that the bits of the differentiated word are added to the proper bit locations of the control numbers. A sign extension is also performed on the differentiated value before addition to the control numbers.

The fractional portion $.F^1$ of the sum is applied as an input to a delta-sigma converter 332. The output of the delta-sigma converter 332 represents an error correcting value $.F^1+E$ that is used to adjust the divisor used by the divider 322. The error value is added to the integer portion $N^1$ of the fractional frequency control number in the adder 326. The sum is used as the divisor $N.F^1+E$ for frequency division within the divider 322 to accomplish phase modulation and frequency selection.

Figure 3B:
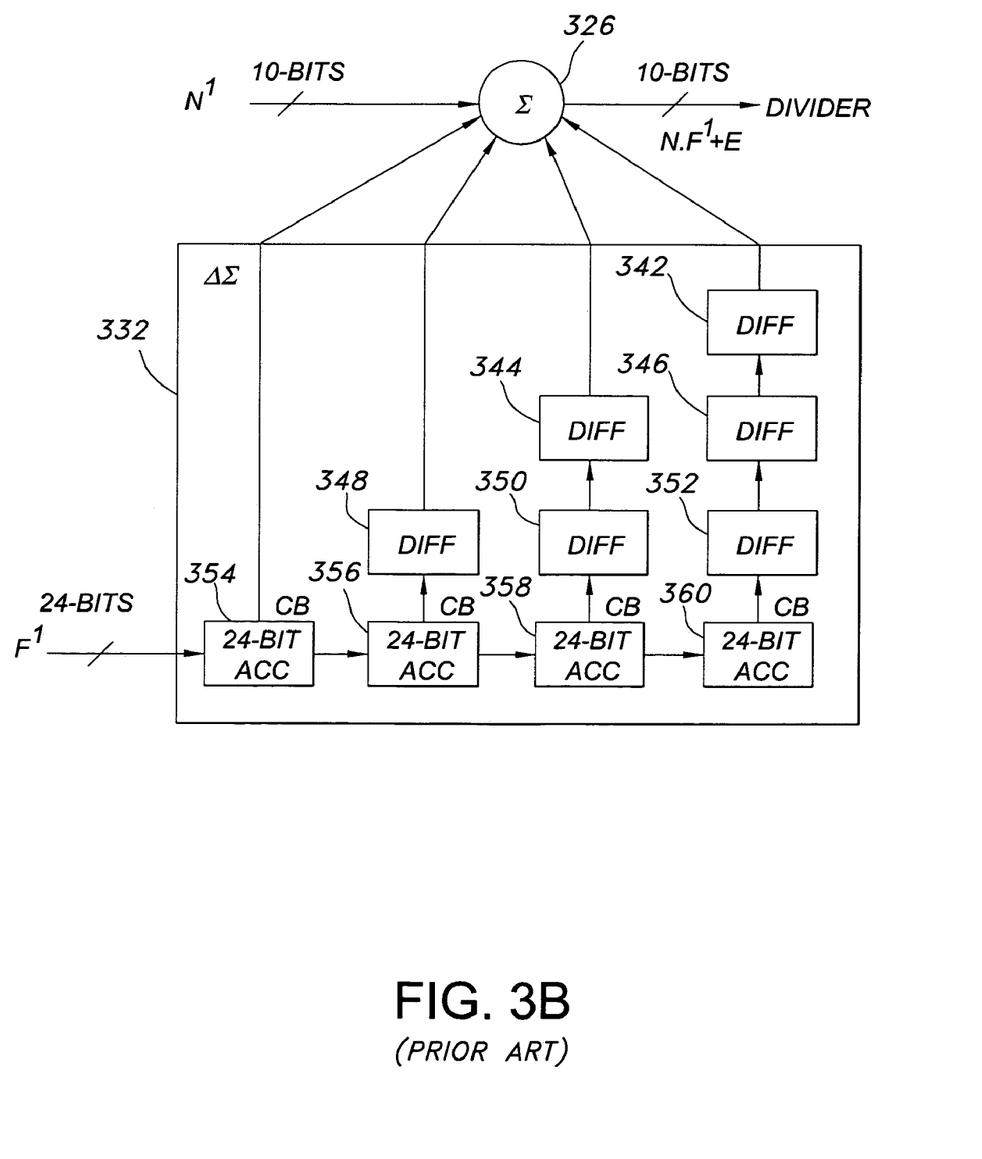
FIG. 3b is a block diagram of a sigma-delta converter used in the modulated fractional divider synthesizer of FIG. 3b.

FIG. 3b is a block diagram of the sigma-delta converter 332. For a 24-bit fractional input word, four 24-bit accumulators 354, 356, 358, 360 are used for fourth order sigma-delta modulation. For the first accumulator 354, the carry bit (CB) is added directly to the integer $N^1$ portion within the adder 326. For each subsequent accumulator 356, 358, 360, the carry bit is incrementally differentiated within differentiators 342, 344, 346, 348, 350, 352. The differentiated carry bits of each subsequent accumulator 356, 358, 360 is added along with the carry bit of the first accumulator 354 to provide the divisor for the next calculation cycle.

By incrementing or decrementing the phase accumulation registers with the fractional control input $.F^1$, the phase of a generated signal at which the phase locked loop 334 is locked is advanced or retarded by the entered phase offset from BIU 208. Using a conventional MFD integrated circuit, phase increments of 0.000001 degrees (finer with more bits of resolution) are obtainable and the phase can be varied over +/−180 degrees.

Each mixer 202 and 204 in FIG. 2b is driven by separate but identical MFD synthesizers 206 and 207. Both synthesizers 206 and 207 are set to exactly the same frequency (common frequency reference) so that the AIC module 205 uninverted output frequency of the cancellation output signal equals the input signal frequency. The phase offset to synthesizer 206 is varied by entering phase offset (ϕ) increments under control of a modified receiver module (405 in FIG. 4) sensing an interfering signal null, thereby varying the phase of the heterodyned cancellation output signal. The IF passband of the AIC module 205 limits the bandwidth of the cancellation.

Figure 4:
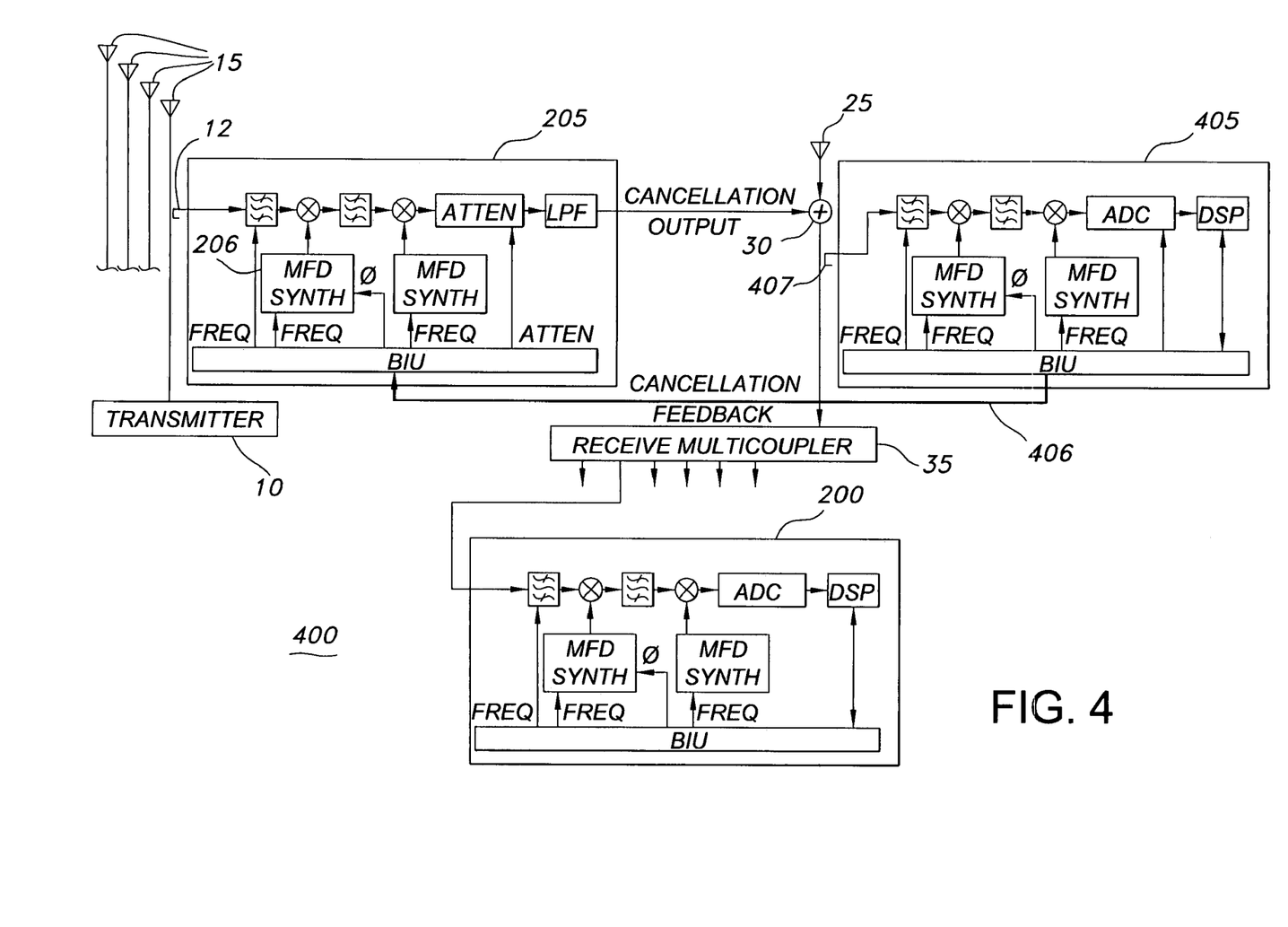
FIG. 4 is a block diagram of an adaptive interference cancellation receiving system of the present invention using the adaptive interference cancellation module of FIG. 2b.

An adaptive interference cancellation receiving (AIC) system 400 of the present invention is shown in FIG. 4. The AIC receiving system 400 in FIG. 4 is similar to that shown in FIG. 1 with the AIC module 205 of FIG. 2b substituted for the amplitude and phase control 20. The receiver module 200 of FIG. 2a is used as the receiver module 40 of FIG. 1. The receive multicoupler 35 may be used if multiple receiver modules 200 are required.

The conventional receiver module 200 may be modified into a null detector 45 of FIG. 1. A null detector or AIC controller 405 in FIG. 4 detects nulls in the interfering signal by hosting cancellation null detection software in addition to standard receiver functions. The AIC controller 405 can be used to control the frequency and variable phase and amplitude of the slave AIC module 205 via a standard system digital communications bus 406 to provide a cancellation feedback signal. The cancellation feedback signal is a digital word representative of in-band signal energy power. A phase and amplitude data word of the cancellation feedback signal are varied to obtain a null. The null detector module 405 may be coupled to the receive multicoupler 35 as shown in FIG. 1 or may be coupled to the receive input with another directional coupler 407 as shown in FIG. 4.

Also shown in FIG. 4 are multiple transmit antennas 15 that may be connected to additional transmitters (not shown) to accommodate a multiple transmitter system. Each transmitter 10 requires its own AIC module 205 that retunes when its associated transmitter 10 retunes. Each AIC module 205 provides its own cancellation output signal to summing circuit 30. In a multiple transmitter system one AIC controller 405 is switched among the transmitters 10. Amplitude and phase values to provide nulls are stored within each AIC module 205. In practice in an installation with immobile antennas frequent re-nulling may not be required. One AIC controller 405 may be programmed to periodically scan each AIC channel and make slight adjustments. In a very dynamic moving environment, it may be necessary to have one AIC controller 405 dedicated to one AIC module 205 to constantly readjust the null.

Operation of the adaptive interference cancellation receiving system 400 in FIG. 4 is similar to that in FIG. 1. Transmitter 10 transmits with transmit antenna 15 at some frequency different than that of receiver 200 that may be collocated with the transmitter 10 and is receiving simultaneously. Some of the transmit signal from transmitter 10 is sampled with coupler 12. Coupler 12 may be a directional coupler or some other means of coupling a radio signal. Multiple couplers 12 are used with multiple antennas 15 and transmitters 10. The signal from the coupler 12 is passed to the AIC module 205 tuned to the transmit frequency where the amplitude and phase of the sampled transmit signal are adjusted giving a cancellation output signal. Multiple AIC modules 205 are used in a multiple transmitter 10 system with one AIC module 205 per transmitter 10. The amplitude and phase are adjusted in AIC module 205 as discussed above in conjunction with FIG. 2b.

The receive antenna 25 receives desired signals and the transmit signal from transmit antenna 15. The received desired signals and the undesired transmit signal are summed with the cancellation output signal from the AIC module 205 in summing circuit 30. With a multiple transmitter system multiple cancellation output signals are summed with multiple undesired transmit signals in summing circuit 30. Summing circuit 30 may be a hybrid, directional coupler, or some other means of summing multiple radio signals known in the art. When the cancellation output signal has the correct phase and amplitude, the undesired transmit signal received by antenna 25 is cancelled in summing circuit 30.

The received signals are passed to multicoupler 35 where they are split and passed to receivers 200. A received signal may be passed from multicoupler 35 or second coupler 407 the AIC controller 405 that generates the cancellation feedback signal on bus 406 to adjust the AIC module 205 to cancel the undesired transmit signal in summing circuit 30. One AIC controller 405 is used to generate cancellation feedback signals to multiple AIC modules 405 by switching between them in a multiple transmitter system.

Figure 5:
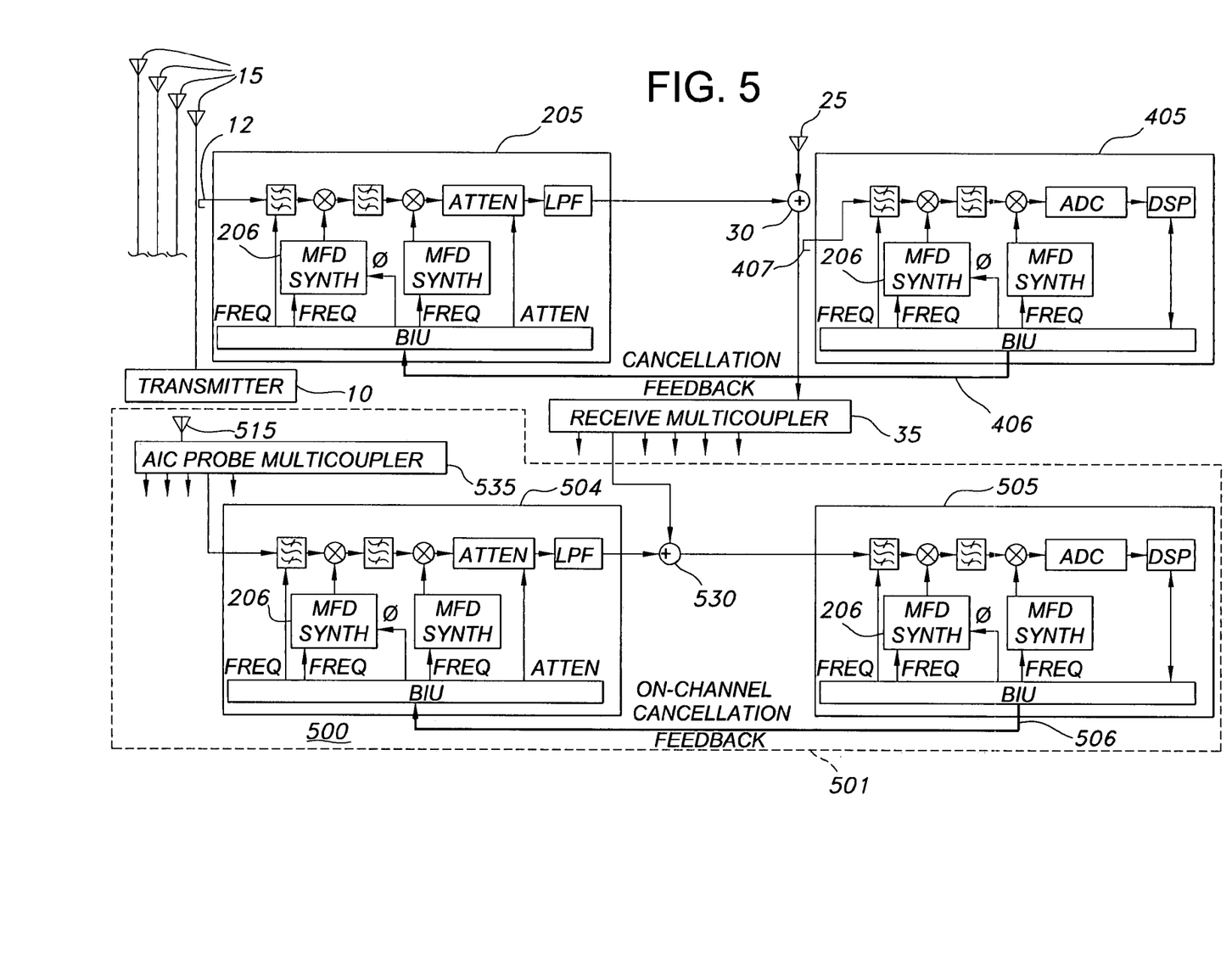
FIG. 5 is a block diagram of the adaptive interference cancellation receiving system of FIG. 4 with an on-channel interference cancellation subsystem added.

The AIC receiving system 400 of FIG. 4 may be expanded into a two-layer AIC receiving system architecture 500 as shown in FIG. 5. The AIC receiving system 400 is a fundamental transmitter frequency canceling layer as shown in FIG. 4 ahead of the receiver multicoupler 35 to minimize receiver-generated interference phenomena due to strong impinging transmitter signals on the transmitter frequencies from transmitter(s) 10. An on-channel interference cancellation subsystem 501 to minimize externally generated on-channel interference is added at the receivers 200 in FIG. 4 after the multicoupler 35 to cancel interfering signals in the channel to which the receivers 200 are tuned. The receivers 200 of FIG. 4 are now AIC controllers 405 of FIG. 4 as well as receivers and are designated as AIC controller/receivers 505 in FIG. 5. The on-channel subsystem 501 is intended to remove on-channel interference as sensed by an independent probe antenna 515 located in or near the transmit antenna 15 field.

The on-channel subsystem 501 has a second AIC module 504 dedicated to each AIC controller/receiver 505 and is connected to the probe antenna 515 through an AIC probe multicoupler 535 along with additional second AIC modules 504 as required. A single AIC controller/receiver 505 system may have the second AIC module 504 connected directly to the probe antenna 515. Both multicouplers 35 and 535 are not needed in a single receiver system. The multicouplers 35 and 535 enable adding additional AIC controller/receivers 505 as required by the system along with their associated second summing circuits 530 and second AIC modules 504. The system 500 may be expanded to any number of receivers.

Unlike the transmitter fundamental AIC system 400, the interference samples are obtained live from the probe antenna 515 without regard to their actual source (transmitters, radar, rusty bolts, adjacent ships, etc.). The on-channel cancellation output signal from the second AIC module 504 is applied to the summing circuit 530 where the interfering signal received by antenna 25 and passed through summing circuit 30 and receive multicoupler 35 is cancelled. A summing circuit 530 is included with each AIC controller/receiver 505 and second AIC module 504.

The AIC controller/receiver modules 505 are used as receivers and AIC controllers. Thus no separate AIC controller modules 405 are needed as in the fundamental layer. On-channel cancellation feedback signals are provided to the second AIC modules 504 via a system bus 506 from each of the AIC controller/receiver modules 505.

Figure 6:
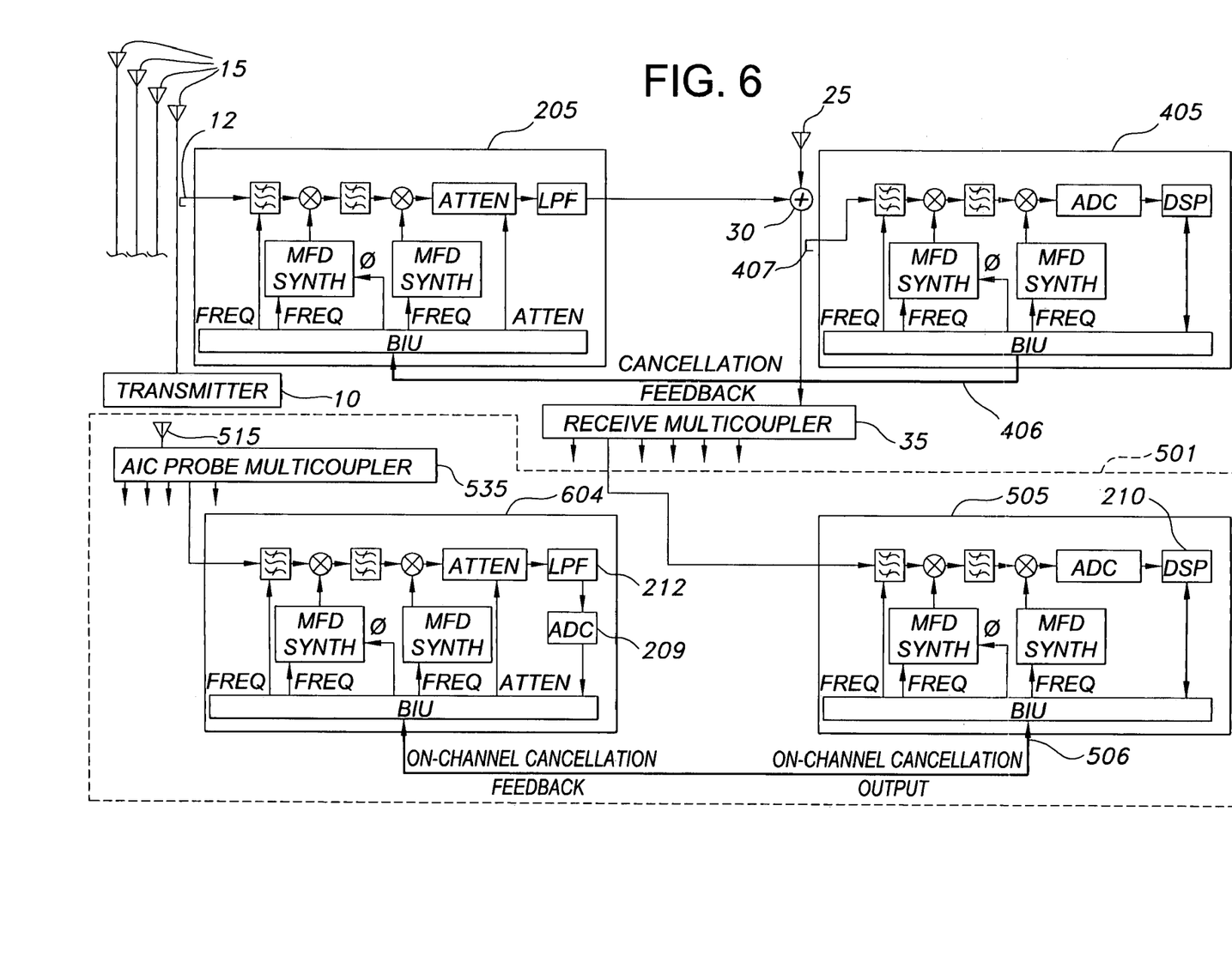
FIG. 6 is a block diagram of the adaptive interference cancellation receiving system of FIG. 5 with digital on-channel interference cancellation.

The on-channel interference subsystem 501 of FIG. 5 is an analog cancellation system. The second summing circuit 530 cancels the analog interfering signal when the analog on-channel cancellation output signal from the second AIC module is summed with it. The on-channel interference subsystem can be modified to provide digital cancellation as shown in FIG. 6. In FIG. 6 the second AIC module 504 of FIG. 5 is modified into a digital AIC module 604 by adding ADC 209 to digitize the on-channel cancellation output signal from LPF 212. The digital on-channel cancellation output signal is passed to the AIC controller/receiver 505 over the system bus 506. In the AIC controller/receiver 505, cancellation of the interfering signal takes place in the DSP 210 by using the digital on-channel cancellation output signal whose phase and amplitude are adjusted in the digital AIC module 604. With this approach the second summing circuit 530 is eliminated.

The adaptive interference cancellation receiving system using synthesizer phase accumulation system of the present invention may be extended to any size and configuration via conventional architecture means. The adaptive interference cancellation receiving system of the present invention may be used in any frequency range including LF, HF, VHF, and UHF.

It is believed that adaptive interference cancellation receiving system using synthesizer phase accumulation system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An adaptive interference cancellation receiving system using synthesizer phase accumulation comprising:
   a coupler coupled to a transmitter and for sampling an undesired transmit signal;
   an adaptive interference canceller (AIC) module connected to the coupler and for varying phase and amplitude of the sampled undesired transmit signal to provide a cancellation output signal wherein said adaptive interference canceller module comprises a modified receiver module having a modulated fractional divider (MFD) frequency synthesizer providing a variable phase offset for varying the phase and having an attenuator for varying the amplitude of the sampled undesired transmit signal;
   a receive antenna for receiving receive signals and the undesired transmit signal;
   a first summing circuit connected to the receive antenna and the adaptive interference module and for summing the receive signals, the received undesired transmit signal, and the cancellation output signal to cancel the received undesired transmit signal; and
   an AIC controller module coupled to the first summing circuit output and to detect a null in the undesired transmit signal, to generate a cancellation feedback signal and to provide the cancellation feedback signal to the AIC module to vary the phase and amplitude of the cancellation output signal.

2. The adaptive interference cancellation receiving system using synthesizer phase accumulation of claim 1 wherein the modified receiver module further comprises:
   a preselector to filter the sampled undesired transmit signal;
   a first mixer to connected to the preselector and to the MFD frequency synthesizer and to down convert the sampled undesired transmit signal to an intermediate frequency (IF) signal;
   a bandpass filter connected to the first mixer and to filter the IF signal;
   a second mixer connected to the bandpass filter and to convert the IF signal to the cancellation output signal with a frequency of the sampled undesired transmit signal;
   a second MFD synthesizer connected to the second mixer to provide an injection signal;
   the attenuator connected to the second mixer to attenuate the cancellation output signal; and
   a bus interface unit to provide frequency control to the preselector, the MFD synthesizer, and the second MFD synthesizer, phase control to the MFD synthesizer, and attenuation control to the attenuator.

3. The adaptive interference cancellation receiving system using synthesizer phase accumulation of claim 1 further comprising a receive multicoupler for coupling a plurality of receivers to the first summing circuit.

4. The adaptive interference cancellation receiving system using synthesizer phase accumulation of claim 3 wherein the AIC controller module is connected to the receive multicoupler and detects the null in the undesired transmit signal.

5. The adaptive interference cancellation receiving system using synthesizer phase accumulation of claim 1 further comprising a second coupler for coupling the AIC controller module to the first summing circuit output to detect the null in the undesired transmit signal.

6. The adaptive interference cancellation receiving system using synthesizer phase accumulation of claim 1 wherein said modulated fractional divider synthesizer further comprises:
   a phase locked loop frequency synthesizer section for providing an injection signal with a variable phase offset; and
   a modulation control section for providing frequency and variable phase offset control for the injection signal said modulation control section further comprising a delta-sigma modulator with accumulators for providing the variable phase offset.

7. The adaptive interference cancellation receiving system using synthesizer phase accumulation of claim 1 further comprising an on-channel interference cancellation subsystem for canceling on-channel interference said on-channel interference subsystem further comprising:
   a probe antenna located near a transmit antenna and for sampling on-channel signals;
   a second AIC module connected to the probe antenna and tuned to a frequency of an on-channel signal and for varying phase and amplitude of the sampled on-channel signal to provide an on-channel cancellation output signal said second AIC module further comprising a frequency synthesizer having the synthesizer phase accumulation for varying the phase of the sampled on-channel signal;
   a second summing circuit connected to the first summing circuit and the second AIC module and for summing the receive signals, a received on-channel signal, and the on-channel cancellation output signal to cancel the received on-channel signal; and
   an AIC controller/receiver module coupled to the second summing circuit output and to receive the receive signals and to detect a null in the on-channel signal and to generate an on-channel cancellation feedback signal and to provide the on-channel cancellation feedback signal to the second AIC module that varies the phase and amplitude of the cancellation output signal.

8. The adaptive interference cancellation receiving system using synthesizer phase accumulation of claim 7 further comprising:
   an AIC probe multicoupler connected to the probe antenna;
   a plurality of additional second AIC modules connected to the AIC probe multicoupler and tuned to a plurality of frequencies of the on-channel signals and for varying phase and amplitude of the sampled on-channel signals to provide a plurality of on-channel cancellation output signals said plurality of second AIC modules further comprising frequency synthesizers with synthesizer phase accumulation for varying the phase of the sampled on-channel signals;
   a receive multicoupler connected between the first summing circuit and the second summing circuit;
   a plurality of additional second summing circuits connected to the receive multicoupler and the plurality of additional second AIC modules and for summing the receive signals, the receive on-channel signals, and the on-channel cancellation output signals to cancel the received on-channel signals; and
   a plurality of additional AIC controller/receiver modules coupled to the plurality of additional summing circuit outputs and to receive the receive signals and to detect nulls in the on-channel signals and to generate on-channel cancellation feedback signals and to provide the on-channel cancellation feedback signals to the plurality of additional second AIC modules that vary the phase and amplitude of the cancellation output signals.

9. The adaptive interference cancellation receiving system using synthesizer phase accumulation of claim 1 further comprising an on-channel interference cancellation subsystem for canceling on-channel interference said on-channel interference subsystem further comprising:
   a probe antenna located near a transmit antenna for sampling on-channel signals;
   a digital AIC module connected to the probe antenna and tuned to a frequency of an on-channel signal and for varying phase and amplitude of the sampled on-channel signal to provide a digital on-channel cancellation output signal said second AIC module further comprising a frequency synthesizer with the synthesizer phase accumulation for varying the phase of the sampled on-channel signal; and
   an AIC controller/receiver module coupled to the first summing circuit output and to receive the receive signals and connected to the digital AIC module and to receive the digital on-channel cancellation output signal wherein said AIC controller/receiver module comprises a digital signal processor that detects a null in the on-channel signal and generates an on-channel cancellation feedback signal for the digital AIC module that varies the phase and amplitude of the on-channel cancellation output signal.

10. The adaptive interference cancellation receiving system using synthesizer phase accumulation of claim 9 further comprising:
    an AIC probe multicoupler connected to the probe antenna;
    a plurality of additional digital AIC modules connected to the AIC probe multicoupler and tuned to a plurality of frequencies of the on-channel signals and for varying phase and amplitude of the sampled on-channel signals to provide a plurality of digital on-channel cancellation output signals said plurality of second AIC modules further comprising frequency synthesizers with synthesizer phase accumulation for varying the phase of the sampled on-channel signals;
    a receive multicoupler connected to the first summing circuit; and
    a plurality of additional AIC controller/receiver modules coupled to the first multicoupler outputs and to receive the receive signals and connected to the plurality of additional digital AIC modules and to receive the digital on-channel cancellation output signals wherein said plurality of AIC controller/receiver modules comprise digital signal processors that detect nulls in the on-channel signals and generate on-channel cancellation feedback signals and provide the on-channel cancellation feedback signals for the plurality of additional second AIC modules that vary the phase and amplitude of the on-channel cancellation output signals.

11. An adaptive interference cancellation receiving system using synthesizer phase accumulation comprising:
    a fundamental transmitter frequency canceling layer said fundamental transmitter frequency canceling layer further comprising:
    a plurality of couplers coupled to a plurality of transmitters for sampling undesired transmit signals;
    a plurality of adaptive interference canceller (AIC) modules connected to the plurality of couplers and for varying phase and amplitude of the sampled undesired transmit signals to provide cancellation output signals said adaptive interference canceller modules further comprising frequency synthesizers having the synthesizer phase accumulation for varying the phase of the sampled undesired transmit signals;

a receive antenna for receiving receive signals and the undesired transmit signals from the transmitters;

a receive multicoupler connected to the receive antenna and for splitting the receive signals and the undesired transmit signals;

a first summing circuit connected to the receive antenna and the adaptive interference modules and for summing the receive signals, the received undesired transmit signal, and the cancellation output signals to cancel the received undesired transmit signals; and an AIC controller module coupled to the first summing circuit output and to detect nulls in the undesired transmit signals and to generate cancellation feedback signals and to provide the cancellation feedback signals to the AIC modules that vary the phase and amplitude of the cancellation signal; and an on-channel interference cancellation subsystem layer for canceling on-channel interference signals said on-channel interference subsystem further comprising:

a probe antenna located near a transmit antenna and for sampling the on-channel interference signals;

an AIC probe multicoupler connected to the probe antenna;

a plurality of second AIC modules connected to the AIC probe multicoupler and tuned to a plurality of frequencies of the on-channel interference signals and for varying phase and amplitude of the sampled on-channel interference signals to provide a plurality of on-channel cancellation output signals said plurality of second AIC modules further comprising frequency synthesizers having synthesizer phase accumulation that varies the phase of the sampled on-channel interference signals;

a plurality of second summing circuits connected to the receive multicoupler and the plurality of second AIC modules and for summing the receive signals, the receive on-channel interference signals, and the on-channel cancellation output signals to cancel the received on-channel interference signals; and a plurality of AIC controller/receiver modules coupled to the plurality of second summing circuits and to receive the receive signals and to detect nulls in the on-channel interference signals and to generate on-channel cancellation feedback signals and to provide the on-channel cancellation feedback signals to the plurality of second AIC modules that vary the phase and amplitude of the cancellation output signals.

12. The adaptive interference cancellation receiving system using synthesizer phase accumulation of claim 11 wherein the AIC controller module is connected to the receive multicoupler and detects the nulls in the on-channel interference signals.

13. The adaptive interference cancellation receiving system using synthesizer phase accumulation of claim 11 further comprising a second coupler for coupling the AIC controller module to the first summing circuit output to detect the nulls in the on-channel interference signals.

14. The adaptive interference cancellation receiving system using synthesizer phase accumulation of claim 11 wherein the AIC module further comprises an attenuator for varying the amplitude and a modulated fractional divider synthesizer for varying the phase said modulated fractional divider synthesizer further comprising:

a phase locked loop frequency synthesizer section for providing an injection signal with a variable phase offset; and a modulation control section for providing frequency and variable phase offset control for the injection signal said modulation control section further comprising a delta-sigma modulator with accumulators for providing the variable phase offset.

15. A method of adaptive interference cancellation in an adaptive interference cancellation receiving system comprising the step of canceling undesired transmit signals in a fundamental transmitter frequency canceling layer by using a plurality of adaptive interference canceller modules that vary phase and amplitude of sampled undesired transmit signals wherein the step of canceling undesired transmit signals further comprises the steps of:

sampling undesired transmit signals with a plurality of couplers coupled to a plurality of transmitters;

varying phase of the sampled undesired transmit signals in the plurality of adaptive interference canceller (AIC) modules connected to the plurality of couplers said AIC modules having frequency synthesizers with synthesizer phase accumulation for varying the phase of the sampled undesired transmit signals;

providing cancellation output signals from the AIC modules;

receiving receive signals and the undesired transmit signals from the transmitters with a receive antenna;

splitting the receive signals and the undesired transmit signals with a receive multicoupler connected to the receive antenna;

summing the receive signals, the received undesired transmit signal, and the cancellation output signals with a first summing circuit connected to the receive antenna and the adaptive interference modules;

canceling the received undesired transmit signals in the first summing circuit;

detecting nulls in the undesired transmit signals with an AIC controller module coupled to the first summing circuit output; and generating cancellation feedback signals for the AIC modules to vary the phase and amplitude of the cancellation output signals.

16. The method of adaptive interference cancellation in an adaptive interference cancellation receiving system using synthesizer phase accumulation of claim 15 further comprising the steps of canceling on-channel interference signals in a on-channel interference cancellation subsystem layer by using a plurality of second adaptive interference canceller modules for varying phase and amplitude of sampled on-channel interference signals in the second adaptive interference canceller modules by varying phase in a synthesizer having synthesizer phase accumulation.

17. The method of adaptive interference cancellation in an adaptive interference cancellation receiving system using synthesizer phase accumulation of claim 16 further comprising the steps of sampling on-channel interference signals with a probe antenna located near a transmit antenna;

splitting the on-channel interference signals with an AIC probe multicoupler connected to the probe antenna;

varying phase of the sampled on-channel interference signals with a plurality of second AIC modules connected to the AIC probe multicoupler said second AIC modules having frequency synthesizers with synthesizer phase accumulation for varying the phase of the sampled on-channel interference signals;

varying amplitude with the second AIC modules;

providing a plurality of on-channel cancellation output signals;

summing the receive signals, the receive on-channel interference signals, and the on-channel cancellation output signals with a plurality of second summing circuits connected to the receive multicoupler and the plurality of second AIC modules;

canceling the received on-channel interference signals in the plurality of summing circuits;

receiving the receive signals with a plurality of AIC controller/receiver modules coupled to the plurality of summing circuit outputs;

detecting nulls in the on-channel interference signals in the plurality of AIC controller/receiver modules; and generating on-channel cancellation feedback signals for the plurality of second AIC modules to vary the phase and amplitude of the cancellation output signals.

* * * * *